Figure 1:
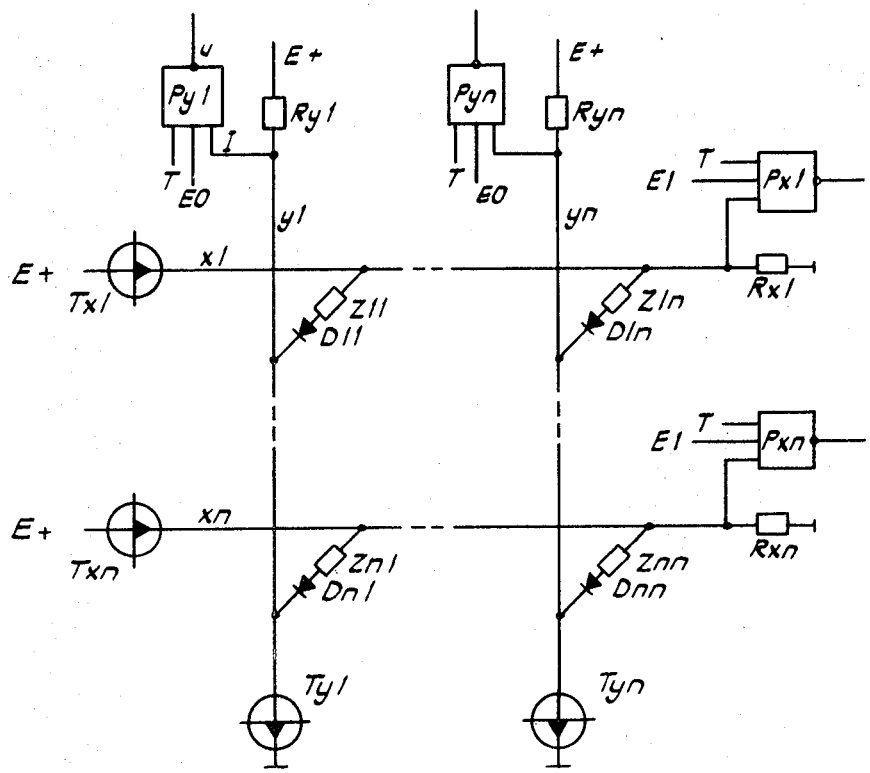

United States Patent

[11] 3,609,546

| [72] | Inventors | Bengt-Gunnar Magnusson<br>Enskede;<br>Sture Erwin Hilding Nilsson, Vendelso,<br>both of Sweden |
|---|---|---|
| [21] | Appl. No. | 807,037 |
| [22] | Filed | Mar. 13, 1969 |
| [45] | Patented | Sept. 28, 1971 |
| [73] | Assignee | Telefonaktiebolaget LM Ericsson<br>Stockholm, Sweden |
| [32] | Priority | Apr. 10, 1968 |
| [33] | | Sweden |
| [31] | | 4852/68 |

[54] ARRANGEMENT FOR INDICATING LEAK CURRENTS IN A DIODE MATRIX BY MEANS OF CURRENT SENSORS IN THE CONDUCTORS OF THE MATRIX
1 Claim, 2 Drawing Figs.

[52] U.S. Cl. .................................................... 324/158 D,
324/51, 340/166 R
[51] Int. Cl. ............................................................ G01r 31/02,
G01r 31/22
[50] Field of Search............................................. 324/158,
158 D, 51; 340/248, 250, 176, 166, 253

[56] References Cited
UNITED STATES PATENTS

| 3,084,326 | 4/1963 | Mitchell ...................... | 324/158 |
| 2,926,334 | 2/1960 | Abbott ......................... | 340/176 X |
| 2,935,676 | 5/1960 | Keltz ............................ | 324/158 D |
| 3,028,659 | 4/1962 | Chow et al. .................. | 324/158 D |
| 3,045,168 | 7/1962 | Fellendorf .................... | 324/158 D |
| 3,328,692 | 6/1967 | Lyon ............................ | 324/158 |
| 3,375,497 | 3/1968 | Jones et al. .................. | 340/176 X |
| 3,381,289 | 4/1968 | Arnold ......................... | 340/166 |
| 3,397,388 | 8/1968 | Abramson et al............ | 340/166 |
| 3,462,754 | 8/1969 | Kelley .......................... | 340/253 |

Primary Examiner—Gerard R. Strecker
Attorneys—Hane & Baxley

ABSTRACT: An arrangement for indicating eventual leakage currents through the diodes of a diode matrix includes a potential-indicating means connnected to each conductor of the matrix. The deteriorating operation of any of the diodes causes a potential drop in the associated potential which signifies means indicating the conductor to which the faulty diode is connected. Each potential-indicating means is adjusted to give an indication when the potential drop reaches a value including a certain safety factor determined in advance which deviates from the potential drop resulting when a permitted current passes through the conductor.

INVENTORS
BENGT-GUNNAR MAGNUSSON
STURE ERWIN HILDING NILSSON

BY Hane and Baxley

ATTORNEYS

ARRANGEMENT FOR INDICATING LEAK CURRENTS IN A DIODE MATRIX BY MEANS OF CURRENT SENSORS IN THE CONDUCTORS OF THE MATRIX

This invention refers to an arrangement for indicating leak currents in a matrix. The matrix shall be referable to matrices of the kind that consists of a number of coordinate conductors which cross each other and are insulated in relation to one another. The crossing matrix conductors are interconnected, preferably at each crossing point, by means of a load impedance, for example a relay winding connected in series with a diode. To be able to activate a predetermined load impedance each coordinate conductor is provided with a voltage-connecting means.

In matrices of the type mentioned above, which generally are called diode matrices, it is most desirable to be able to identify quickly a diode showing deteriorated operation in the blocked direction. The fact is that in such diode matrices the purpose of the diode is to limit the current in not selected coordinates in the matrix thus, when a diode passes current in the so-called blocked direction some crossing point nonaddressed load impedances can be activated. This activation of the load impedance located at the crossing point is also called an "indication."

An object of this invention is to provide a means for indicating possible leak currents in a matrix in which the leak currents arise from the deterioration of diode operations.

Figure 2:
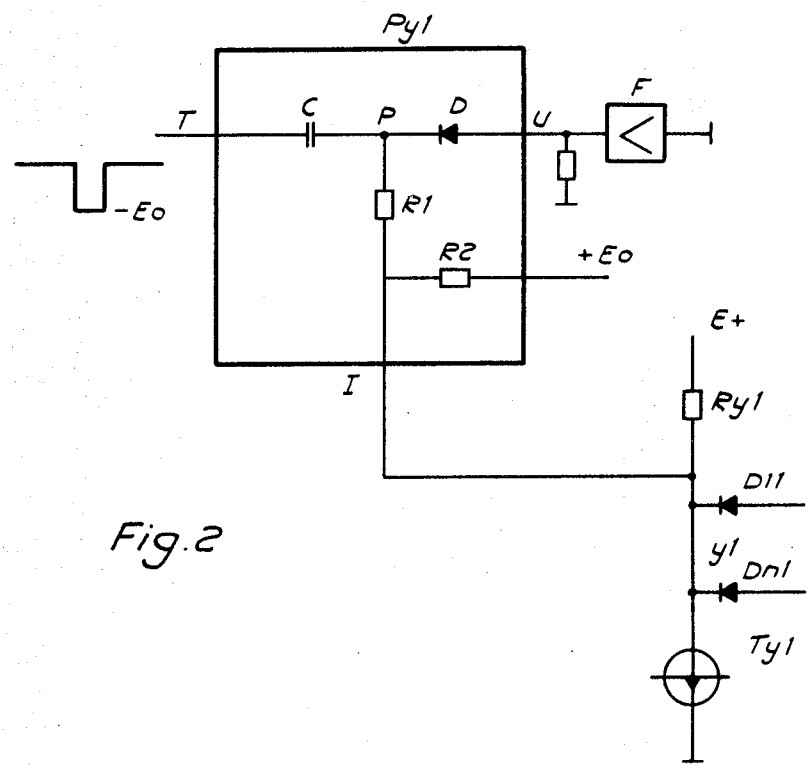

What primarily may be considered to be the characteristics of other objects, features and advantages of the invention will be apparent from the following detailed description when read with the accompanying in which FIG. 1 shows a diode matrix of arbitrary size but in which only four coordinates have been indicated; and FIG. 2 shows a potential-indicating means utilized in the matrix of FIG. 1.

FIG. 1 shows a diode matrix of arbitrary size but in which, for simplicity, only four coordinate conductors have been indicated. The horizontal coordinate conductors are referenced $x1$ and $xn$ and the vertical coordinate conductors are referenced $u1$ and $un$. The coordinate conductor $x1$ is connected to positive potential at one of its terminals through a voltage-connecting means in the form of a transistor $Tx1$ while the other terminal of the coordinate conductor is connected to ground potential via a resistance $Rx1$. Similarly, the coordinate conductor $xn$ is connected to positive potential at one of its terminals through a voltage-connecting means $Txn$ while the other terminal of the coordinate conductor is connected to ground potential via a resistance $Rxn$. As far as the vertical y-coordinate conductors are concerned, for example, the coordinate conductor $y1$ is connected to ground potential at one of its terminals through a voltage-connecting means $Ty1$ and at the other terminal it it connected to positive potential via a resistance $Ry1$. A corresponding connection is intended for the vertical coordinate conductor $yn$ where the different parts have been indicated by a reference index associated with this coordinate conductor.

To be able to control a diode matrix of the type described above it is not necessary to connect the potential E+ to the vertical coordinate conductors $y1-yn$. However, this potential is connected to the conductors in order to obtain an indication of possible leak currents passing through the diodes of the matrix. The coordinate conductors $x1-xn$ and $y1-yn$ cross each other reciprocally and are also mutually insulated. Particularly at each crossing point there is found a load impedance connected in series with a diode. There is thus shown the impedance EXAMPLE for example, a relay winding, connected in series with the diode $D11$ at the crossing point between the coordinate conductor $x1$ and the coordinate conductor $y1$. Similarly a load impedance $Znl$ is connected in series with a diode $Dnl$ at the crossing point between the coordinate conductor $xn$ and the coordinate conductor $y1$. It is not necessary for explaining the invention that all crossing points included in the diode matrix should show this series connection of the load impedance and the diode. This relationship is however diagrammatically shown in FIG. 1.

In order to cause current to pass through the load impedance 211 and the diode $D11$ the voltage connecting means $Tx1$ is operated for connection of the potential of polarity E+ and furthermore the voltage connecting means $Tyi$ is operated for connection of ground potential to the matrix. This gives rise to a current passing from the source E+ through the voltage connecting means $Tx1$, the load impedance 211, the diode $D11$ and the voltage-connecting means $Ty$, to ground.

The voltage connecting means $Tx1$ and $Ty1$ which consist of transistors, are operated in the known manner by means of a current selected in a suitable way and connected to the bases of the transistors.

If it is assumed that the diode $Dnl$ is faulty so that it shows a deteriorated diode function, i.e. passes a leak current in the blocked direction, exceeding the normal value, then the potential connected to the coordinate conductor $yl$ would be able to activate the load impedances $Z11$ and $Znl$ through the voltage connecting means $Tx1$ or indicate these impedances, for example in connection with the indication of the load impedance $Znl$, by connecting the voltage-connecting means $Tyn$ and $Tx1$. To be able to eliminate such a faulty connection and activation of a nonindicated load impedance $Z11$ or $Znl$ each coordinate conductor shall be preferably connected to a polarity- or potential-indicating means. The potential-indicating means of the coordinate conductor $yl$ has been referenced $Pyl$ and in the corresponding way the other potential-indicating means of the other coordinate conductors have been provided with reference indexed corresponding to the coordinate conductors.

With reference to FIG. 2 the circuitry of such a potential-indicating means will be further described. The potential-indicating means $Pyl$ has been selected as an example of embodiment. When the voltage-connecting means $Tyl$ is not connected for current passage, the potential or the polarity E+ which suitably may, be not necessarily must, correspond to a reference polarity $+Eo$, will appear in the point P. The potential-indicating means $Pyl$ is a so-called CDR gate utilized as an AND gate and has a capacitor C connected between the point P and the input T, a diode D connected between the point P and the output U, a resistance Rl connected between the point P and the input I, and finally a resistance R2 connected between the input I and the reference polarity $+Eo$. To the output U an amplifier F and a grounded resistance are connected in order to amplify the outgoing signal and in order to obtain a voltage in relation to the reference polarity $+Eo$.

It is obvious that the potential connected to the input I is dependent on the current allowed to pass through the coordinate conductor $yl$. If it is still assumed that the voltage-connecting means $Tyl$ does not pass any current and a pulse $-Eo$ whose amplitude corresponds to the reference polarity $+Eo$, is connected to the input T of the potential-indicating means $Tyl$, zero potential is obtained in the point P. No current will pass through the diode D and for this reason no indication of leak currents is obtained. If, however, in spite of the fact that the voltage-connecting means $Tyl$ does not allow current to pass, leak currents arising from a deteriorated diode function in one of the diodes $D11$ or $Dnl$ connected to the coordinate conductor $yl$, should nevertheless cause a decrease of the potential of the input I. This will give a corresponding decrease of the potential in the point P. At a pulse $-Eo$ in the input T the potential in the point P will accordingly obtain such a value that current passes through the diode D and an indication of leak currents is obtained through the amplifier F.

Thus the potential-indicating means $Pyl$ is adjusted and adapted to give an indication when the potential of the input I shows a value which with a safety factor determined in advance deviates from the potential arising when a permitted current passes through the coordinate conductor. Because the potential-indicating means $Pyl$ consists of an AND gate its output condition is determined by a simultaneous cooperation between the potential connected to the input I, the reference polarity $-Eo$ and the pulse $-Eo$ connected to the input T at a predetermined time at which an indication of possible leak currents is to be obtained.

It is seen from this configuration that the pulse —Eo connected to the input T could be connected to all potential-indicating means giving information about possible fault diodes in the diode matrix. This time-depending pulse can also be connected simultaneously to the pulses which control the voltage-connecting means, in which case information as to whether the right load impedance has been activated, will be obtained. This information must be compared with the addressing circuit.

The invention is of course not limited to the embodiment indicated above but may be modified within the scope of the subsequent claims. The means shown in FIG. 2 must be changed if used for the coordinate conductors $x1$ and $xn$. In the latter case the reference polarity E1 and the time pulses must change polarity and the diode D must be reversed.

We claim:

1. A selection matrix which is monitored for faults comprising: at least first and second row conductors; at least first and second column conductors; said conductors being insulated from each other; a first impedance means connecting said first row conductor to said first column conductor; a second impedance means connecting said first row conductor to said second column conductor; an third impedance means connecting said second row to said first column conductor; a fourth impedance means connecting said second row conductor to said second column conductor; each of said impedance means including an impedance and a diode connected in series; at least four mutually independently operable switchable potential sources; each of said potential sources being connected to one end of each of said conductor, respectively; and at least four indicating means, each of said indicating means being connected to the other end of each of said conductors, respectively, for monitoring the flow of current through the associated conductor and each of said indicating means including means for generating a signal that is related to the current passing through the associated conductor and comparing means for comparing the amplitude of the so generated signal with the amplitude of a reference signal, said comparing means comprising a first resistor having one end connected to said signal generating means, a capacitor having one end connected to the other end of said first resistor, a source of a pulse sampling signal connected to the other end of said capacitor, a diode having one end connected to the other end of said first resistor, an indicator device connected to the other end of said diode, a second resistor having one end connected to said one end of said first resistor and a reference signal source connected to the other end of said second resistor.